United States Patent

Montalvo, III et al.

Patent Number: 5,257,550
Date of Patent: Nov. 2, 1993

[54] WEB TENSION SENSOR

[75] Inventors: William W. Montalvo, III, Raymond; Philip R. Metcalf, Jr., Portland, both of Me.

[73] Assignee: The Montalvo Corporation, Portland, Me.

[21] Appl. No.: 47,388

[22] Filed: Apr. 19, 1993

Related U.S. Application Data

[60] Continuation of Ser. No. 918,686, Jul. 27, 1992, abandoned, which is a division of Ser. No. 607,513, Nov. 1, 1991, Pat. No. 5,159,841.

[51] Int. Cl.⁵ .............................................. G01L 1/22
[52] U.S. Cl. ........................... 73/862.474; 73/862.473
[58] Field of Search ................... 73/862.473, 862.474, 73/862.55

[56] References Cited

U.S. PATENT DOCUMENTS

| | | | |
|---|---|---|---|
| 4,052,891 | 10/1977 | Bartlett | 73/862.474 |
| 4,796,474 | 1/1989 | Koenig | 73/862.632 |
| 5,020,381 | 6/1991 | Bartlett | 73/862.474 X |

Primary Examiner—Herbert Goldstein
Assistant Examiner—Elizabeth L. Dougherty
Attorney, Agent, or Firm—Brooks Haidt Haffner & Delahunty

[57] ABSTRACT

A web tension sensing device supports the end of a rotating roll by means of a housing. A bearing within the housing transmits forces to a beam which carries a strain gage. The beam is mounted within a cylindrical body which can be secured to a fixed structure in a variety of ways.

The beam has a flat middle portion of reduced thickness, where the strain gage is located, and the forward end of the beam is fitted within the bearing, which is a spherical self-aligning bearing.

5 Claims, 6 Drawing Sheets

WEB TENSION SENSOR

This application is a continuation of application Ser. No. 07/918,686, filed Jul. 27, 1992 a division of Ser. No. 07/607,513 now U.S. Pat. No. 5,159,841.

BACKGROUND OF THE INVENTION

1. Field of the Invention

The invention relates to a device for converting mechanical force to an electrical signal. More particularly, it relates to an arrangement for providing an electrical signal in response to tension in a moving web so that such tension can be monitored and controlled.

2. Discussion of the Prior Art

Because of the importance of maintaining the desired tension in webs of material passing over rolls during processing, various methods and devices have been developed for measuring web tension either directly or indirectly. One type of known web tension measuring arrangement comprises means for sensing the force exerted on a roll such as an idler roll by a web moving over and carried by the roll. Such a device can include a transducer which converts mechanical force on the roll to an electrical signal which can be monitored for manual adjustment of web tension or fed to means for automatic web tension control. Transducers have been mounted both within rolls and in roll shaft supporting joints beyond the ends of rolls.

Strain gages located within roll ends are shown, for example, in U.S. Pat. No. 4,784,004. U.S. Pat. No. 4,052,891 shows a plurality of strain gages mounted beyond a roll end in a housing.

Other arrangements for web tension measurement are shown in U.S. Pat. Nos. 3,260,106; 3,763,701; 4,326,424; 4,674,341; 4,691,579 and Re 31,312, which are mentioned here to show the state of the art.

SUMMARY OF THE INVENTION

The invention provides a device for sensing the force exerted on a rotating cylindrical member, whether a live roll or an idler roll, over which a tensioned web passes. A body of the device is attachable through a variety of mounting means, to a fixed structure, such as a machine frame. Extending forward through the body is a profiled beam member which has a flat middle portion of reduced thickness which carries a strain gage.

The forward end of the beam member is fitted within a bearing inside a generally cylindrical housing. The bearing is a spherical self-aligning bearing. The housing supports a rotating roll either directly by being fitted within an end of the roll, or indirectly by fitting around the shaft of a roll.

Force on the roll is transmitted via the housing and the bearing to the beam member to act on the strain gage. Depending on the strain measured, tension in the web can be increased or reduced either automatically or manually.

BRIEF DESCRIPTION OF THE DRAWINGS

In the drawings, like reference characters designate like parts throughout.

DETAILED DESCRIPTION OF PREFERRED EMBODIMENTS

Because of the modular design of its components, transducer arrangement of the invention is adaptable for use for the wide variety of applications encountered in the handling of moving webs of sheet and strip material. The sectional view of FIG. 1 shows the basic components of the web tension sensor of the invention.

Figure 1:
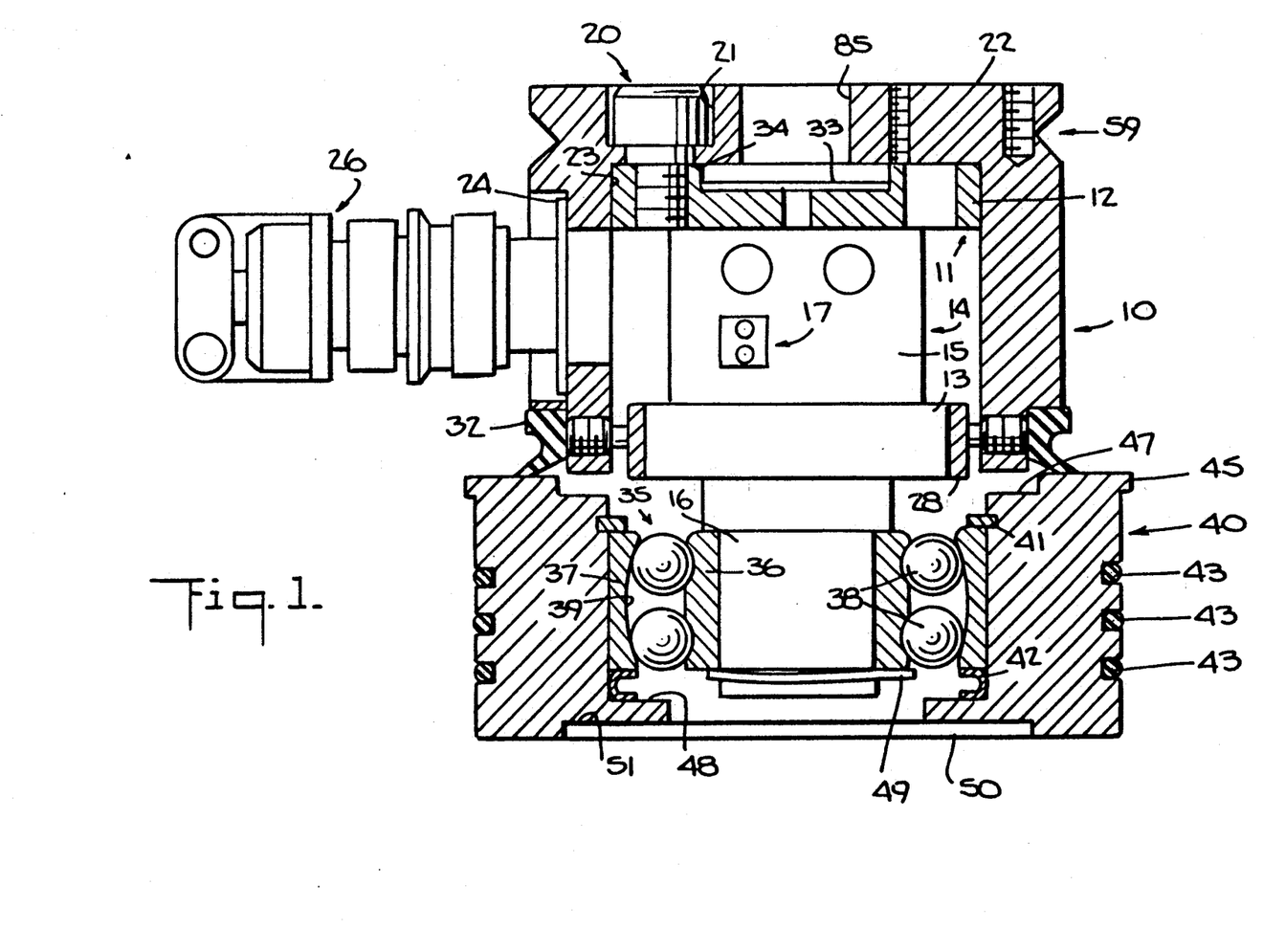
FIG. 1 shows a sectional view of the transducer of the invention adapted for screw mounting to a fixed structure such as a machine frame.
Figure 2:
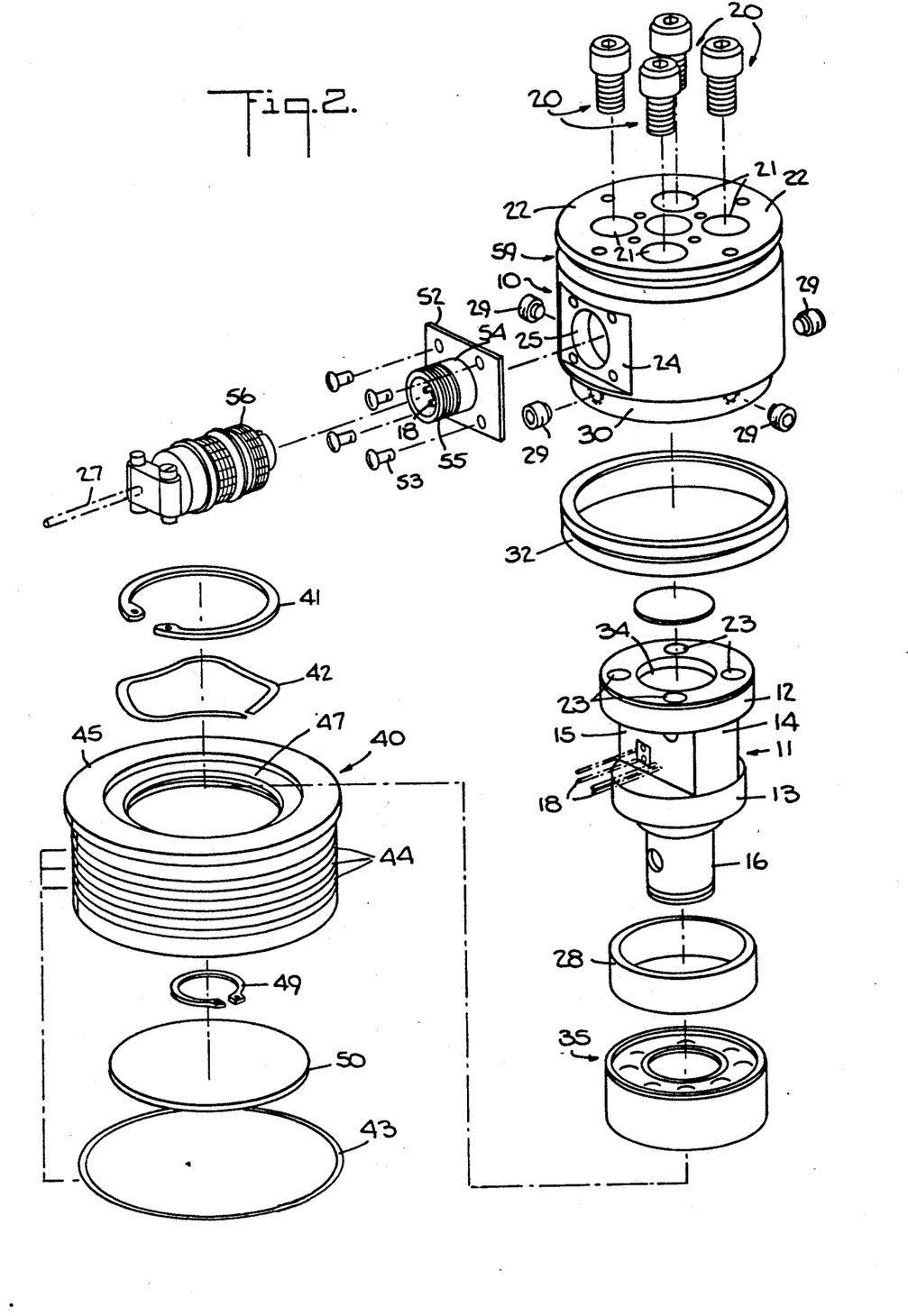
FIG. 2 is an exploded isometric view of the basic transducer assembly of the invention as well as a live-roll housing.

As shown in FIGS. 1 and 2, the transducer assembly has a generally cylindrical body 10 a cylindrical central cavity of which receives a beam member generally designated 11. The beam member 11 has a ring-shaped inner portion 12 which is spaced and separated from a disc-shaped portion 13 of the beam member 11. Extending between the end portion 12 and the disc-shaped portion 13 of the beam member is a central beam 14 which has flat faces 15. The beam 14 is shown as having a width substantially equal to the diameter of the disc-shaped portion 13 and somewhat shorter than the outer diameter of the ring-shaped end portion 12. A cylindrical projection 16 extends outwardly and coaxially from the disc-shaped portion 13 of the beam member 11.

A strain gage assembly 17, which can be a pair of commercially available semiconductor devices is located on one face 15 of the beam 14 for sensing strain imposed on the beam 14. FIG. 2 shows electrical wires 18 extending from the strain gage assembly 17 for conveying from the gage assembly 17 an electrical signal related to mechanical force sensed by the strain gage assembly 17.

The beam member 11 is secured to the body 10 by a plurality of screw fasteners 20 (four shown) which pass through bores 21 in an inner face 22 of the body to be engaged by mating threads of threaded holes 23 in the ring-shaped portion 12 of the beam member 11. As shown in FIG. 1, the beam 14, carrying the strain gage assembly, is entirely within the cylindrical body 10 when the parts are in assembled condition.

As best seen in FIG. 2, the generally annular outer surface of the body 10 has a flat, generally rectangular portion 24, surrounding a bore 25 which passes through the body 10 to the generally cylindrical space therein. An electrical connector assembly generally designated by reference numeral 26 is secured to the body 10 at the flat area 24, as shown in FIG. 1. The connector assembly 26 is illustrated as a commercially available electrical connector manufactured by Amphenol Corporation, but any connector suitable for connecting the wires 18 of the strain gage assembly 17 with an electrical cable 27 leading from the body 10 to measurement and/or control means (not illustrated) may be employed.

A stop ring 28 fitted around the beam portion 13 is surrounded by a plurality (four shown) of threaded, adjustable stop screws 29 which extend through the stepped, smaller diameter, outer end portion 30 of the body 10. This arrangement limits the extent to which the beam member 13 can bend. The stop ring 28 encircles the disc-shaped portion 13 of the beam member as shown in FIG. 1. Surrounding the portion 30 of the body 10 is a resilient seal member 32, shown as a V-ring seal. Also shown in FIG. 2 is a disc-shaped seal 33, which in the assembled condition of the several parts, lies between the inner end of the beam member 11 and the body 10 in a recess 34 formed in the beam member 11. The seal 33 may be formed of rubber, Lexan or other suitable material.

The cylindrical projecting portion 16 of the beam member 11 is surrounded by a spherical bearing generally designated 35. The bearing 35 is of the self-aligning type, having an inner race 36, an outer race 37 and a double row of ball bearings 38 rotatable between said inner and outer races. The outer race 37 has a bearing surface 39 of spherically dished shape, allowing global adjusting relative movement to allow for misalignment of machine frame members as well as slight bending of the beam 11. The outer race 37 is shown held in place between a retaining ring 41 and a wave-spring 42. The wave-spring 42, which can be of the gap type, permits a small degree of axial movement of the bearing 35 relative to a generally cylindrical housing 40 which surrounds the bearing 35, which in turn surrounds the projecting portion 16 of the beam member 11. This permits accomodation of roller expansion upon heating.

When the transducer arrangement of FIGS. 1 and 2 is in use, the housing 40 is received within the end of a roll which is exposed to force exerted by a tensioned web moving over the roll's outer surface. The housing 40 accordingly has a plurality (three shown) of O-ring seals 43 disposed in peripheral grooves 44 formed in the outer cylindrical surface of the housing 40 for frictional fitting within the roll's hollow end. The outer circumference of the housing is chosen to fit closely within the roll, and a peripheral lip or flange 45 formed at the inner end of the housing limits the extent to which the roll can overlie the housing 40.

The cylindrical internal cavity within the housing 40 in which the projecting portion 16 of the beam member 11 and the bearing 35 are received has a stepped annular portion 47 which allows some relative movement between the housing 40 and the body 10. As clearly shown in FIG. 1, the V-ring 32 also allows some relative movement of the housing 40 with respect to the body 10 while sealing the gap therebetween.

An inwardly directed annular flange 48 within the housing 40 cooperates with the outer race 37 of the bearing 35 to provide a seat for the wave-spring 42. A further retaining ring 49 is mounted on the projecting cylindrical portion 16 of the beam member 11 outwardly of the bearing 35, and a housing cap 50, shaped as a flat disc of Lexan or other suitable material, closes and seals the outer end of the bore within the housing 40. The cap 50 can suitably be closely fitted in a recess 51 formed in the housing 40 beyond the flange 48.

When the transducer arrangement of FIGS. 1 and 2 carries a roll, within an end of which the housing 40 is received, forces acting on the roll are transmitted to the housing 40 and thence to the beam member 11. Strain on the beam 14 of the beam member 11 is sensed by the strain gage 17, which converts the mechanical force felt to an electrical signal which is conveyed through wires 18 and the connector 26 to a metering or control device (not shown). The tension in a web carried by the roll can then be adjusted manually or automatically in response to the web tension measured.

Figure 8:
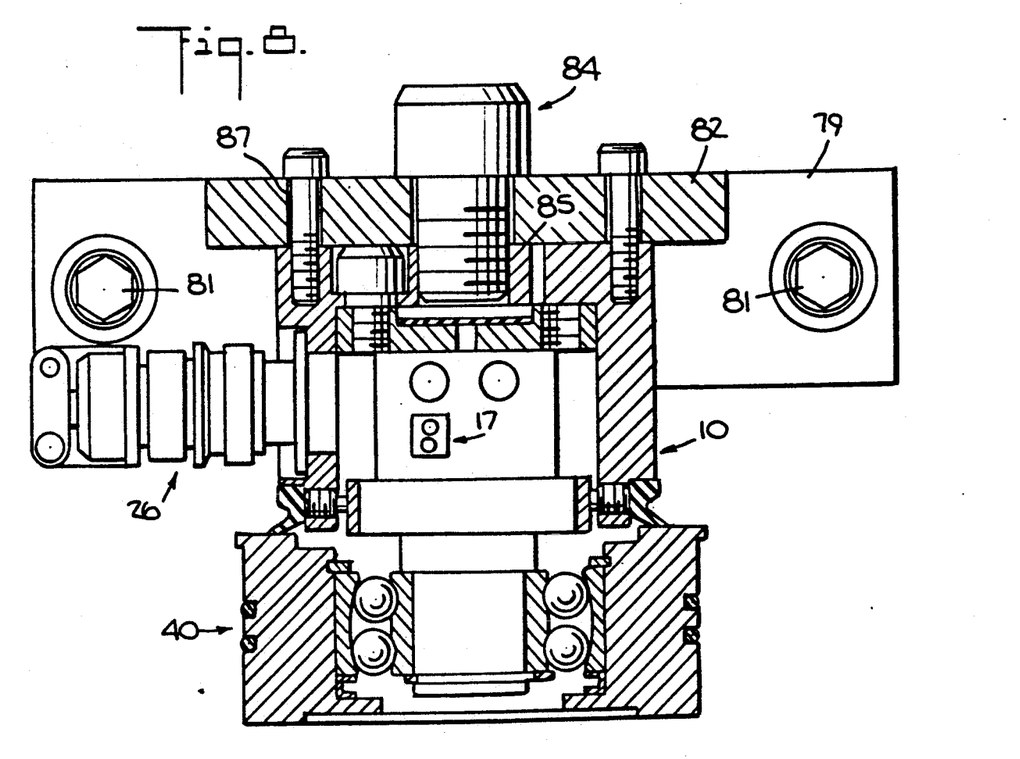
FIG. 8 is a view in section of the transducer with a pillow block mount.
Figures 9, 10:
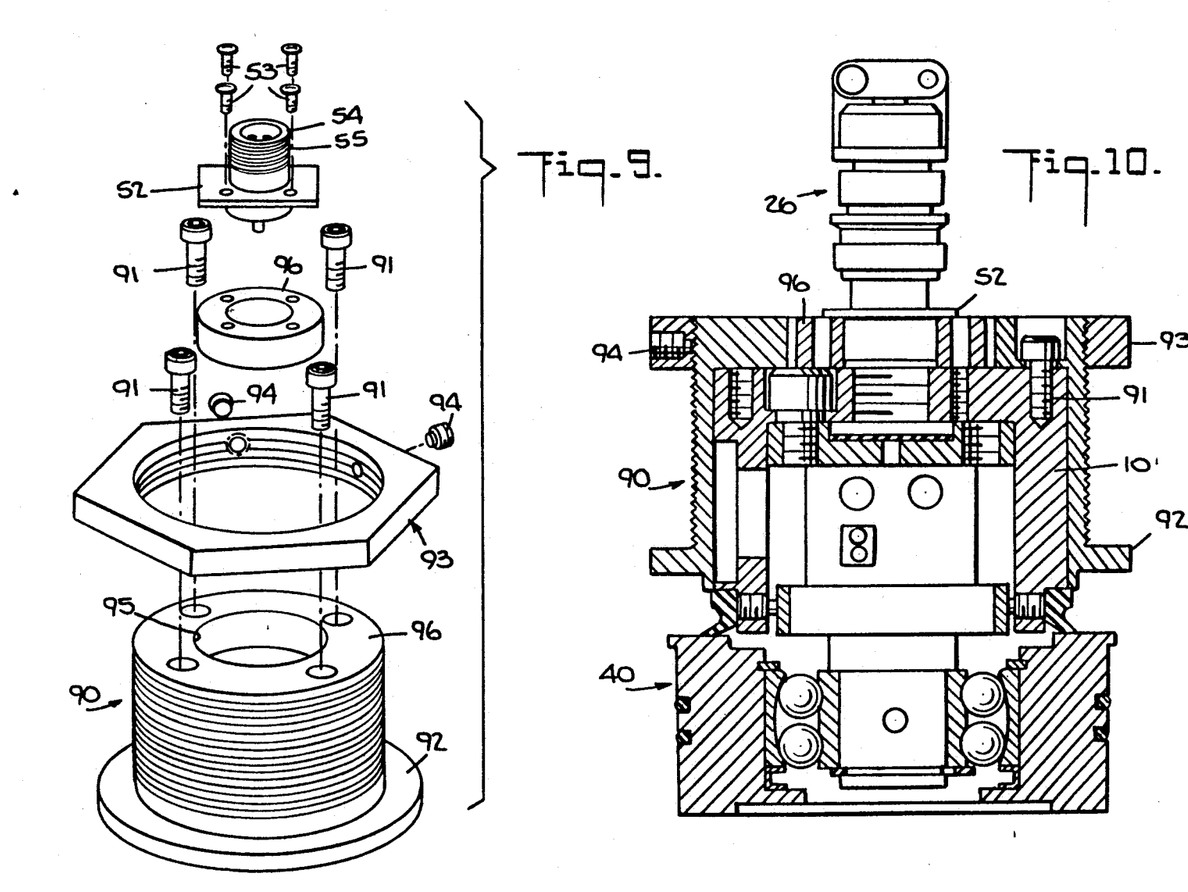
FIG. 9 shows an adjustable mounting arrangement in an exploded isometric view.
FIG. 10 is a sectional view of the transducer adjustably mounted and with an alternative position of an electrical connector.

The electrical connector 26 shown in FIGS. 1 and 2 is also illustrated in the embodiments of FIGS. 4, 6, 8, 9 and 10 although the connector 26 is shown in an alternate position in FIGS. 9 and 10. The connector 26 has a flat rectangular base plate 52 which is fastened to the body 10 by means of screws 53 which can be provided with washers. Projecting from the middle of the base plate 52 is a tubular member 54 with external threads at 55 for interconnection with mating internal threads of female connector element 56. As previously noted, the specific type of electrical connector employed is not considered essential to the present invention, and those acquainted with the art will realize that other types of connector can also be employed.

Figure 3:
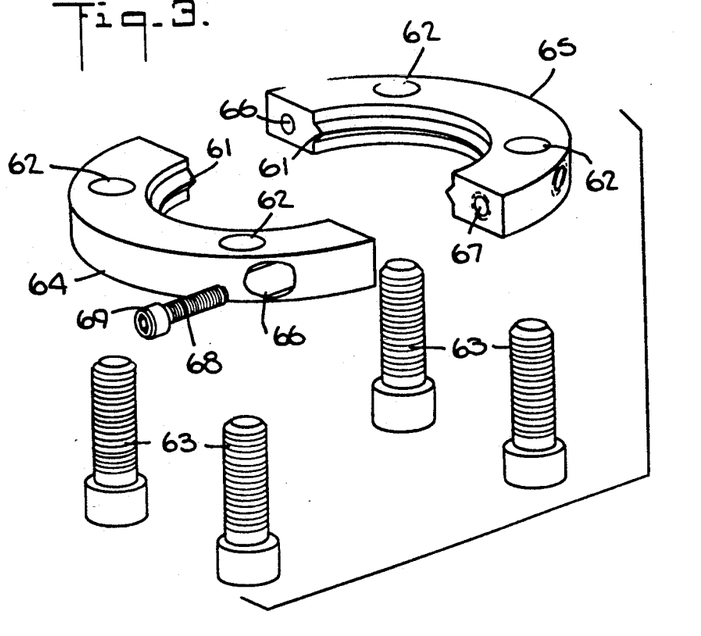
FIG. 3 shows a flange mounting adapter for the transducer of the invention.
Figure 4:
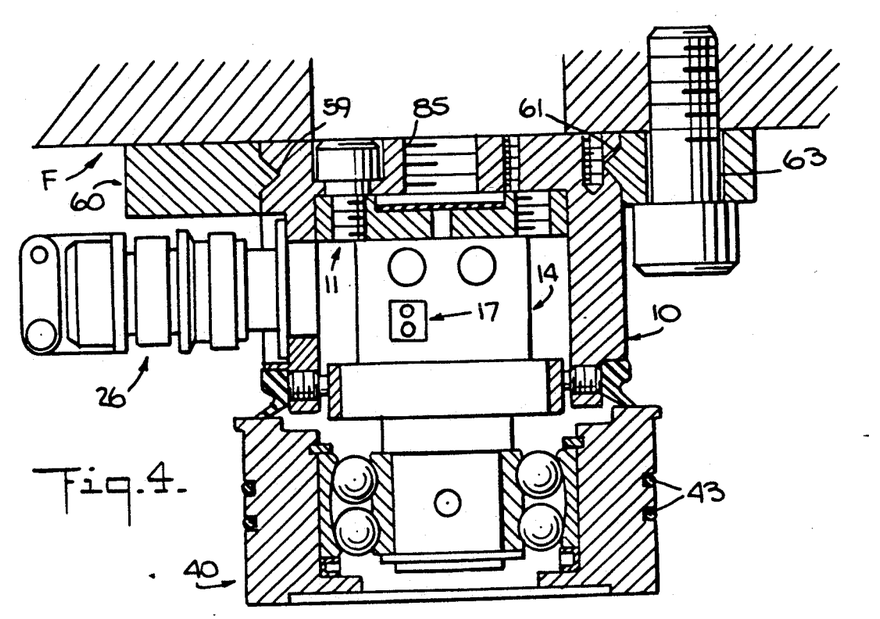
FIG. 4 is a sectional view of the transducer mounted by means of a flange mounting adapter.

The apparatus of FIG. 1 can be secured to a machine frame or other fixed structure by means of a screw or bolt received in a central hole in the inner face 22 of the body 10. FIGS. 3 and 4 illustrate an alternative mounting arrangement. The basic assembly of body 10, beam member 11 and housing 40 shown in FIG. 4 is like that of FIGS. 1 and 2 except that only two O-rings 43 instead of three are shown. The mode of operation is also like that of the device shown in FIGS. 1 and 2, i.e the end of a roll is received about the housing 40, communicating forces acting on the roll to the beam 14 to be sensed by the transducer device 17. Unlike the arrangement shown in FIG. 1, that shown in FIG. 4 is secured to a machine frame or other fixed structure F through a flange adapter shown in exploded view in FIG. 3.

The body 10 has an encircling V-shaped groove 59. A two part flange adapter 60 has an internal V-shaped rib or projection 61 sized and shaped to be matingly received in the groove 59 when the two parts 62 and 63 of the adapter 60 are in place, for securing the body 10 to the fixture or frame F. The flange adapter 60 has a plurality of through holes 62 (four shown) for receiving mounting screws 63 which secure the flange adapter 60 to the fixed structure F as shown in FIG. 4. The flange adapter 60 is shown to be formed of two semi-annular parts 64 and 65. The part 64 has a threaded bore hole 66 which is aligned with a threaded hole 67 in the part 65 to form a continuous passage along a chord passing through the adapter 60 when the adapter 60 is in assembled condition, with the halfrings 64 and 65 secured together in place about the body 10 by a screw 68. Preferably the half-rings 64 and 65 are mutually identical with aligned bores and a screw fastener (not shown) positioned opposite and parallel to the screw 68 illustrated. The fastener receiving holes 66 can be tapped as shown so that the head 69 of the screw 68 is seated in a recess.

Figures 5, 6:
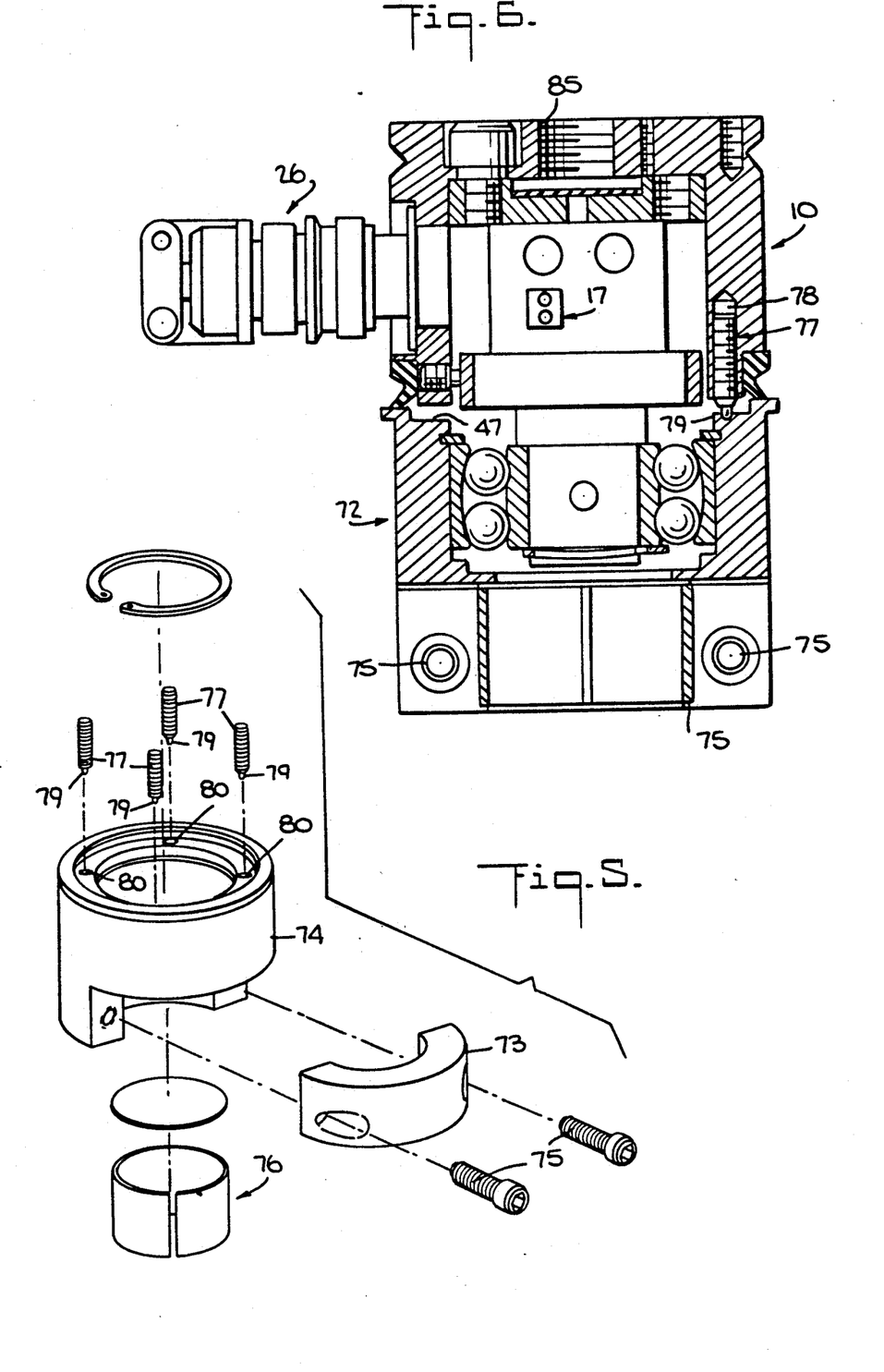
FIG. 5 shows an idler-roll housing for the transducer.
FIG. 6 shows a view in section of the transducer with an idler-roll housing.

FIGS. 5 and 6 show the apparatus of the invention adapted for use in conjunction with an idler roll. This arrangement employs a different form of housing from the housing 40 of FIGS. 1–4. The housing generally designated 72 in FIG. 6 consists basically of two interfitting housing parts; one housing part 73 being formed as a clamp in the shape of half of an annulus and the other housing part 74 being generally shaped as a cylinder with a half-annular segment missing at the cylinder front end. When the parts 73 and 74 are secured together by means of screw fasteners 75 they form the complete cylinder 72.

The two part housing 72 is designed to receive the end of a shaft, such as the shaft of an idler roll, clamped between the two housing parts 73 and 74. When, as will often be the case, the shaft is slightly smaller in diameter than the diameter of the cylindrical space defined within the housing 72, a generally cylindrical step-down bushing 76 can be employed to secure the shaft end within the housing 72.

Another difference between the embodiment illustrated in FIGS. 5 and 6 is the use of several (four shown) spring-loaded plungers 77. The body of each plunger 77, surrounded by a coiled spring normally under compression, is fitted in a bore-hole 78 in the wall of the body 10. The outer end 79 of the spring-loaded plunger 77 is received by a depression 80 in the stepped annular surface 47 of the housing 72. The spring-loaded plungers 77 allow a certain degree of axial movement of the housing 72 with respect to the body 10. This axial mobility can accomodate some linear expansion of a shaft fitted in the housing 72. In the event that there is a failure of bearings in the shaft-roller assembly the plungers 77 will shear off to prevent destruction of the beam 11.

Figure 7:
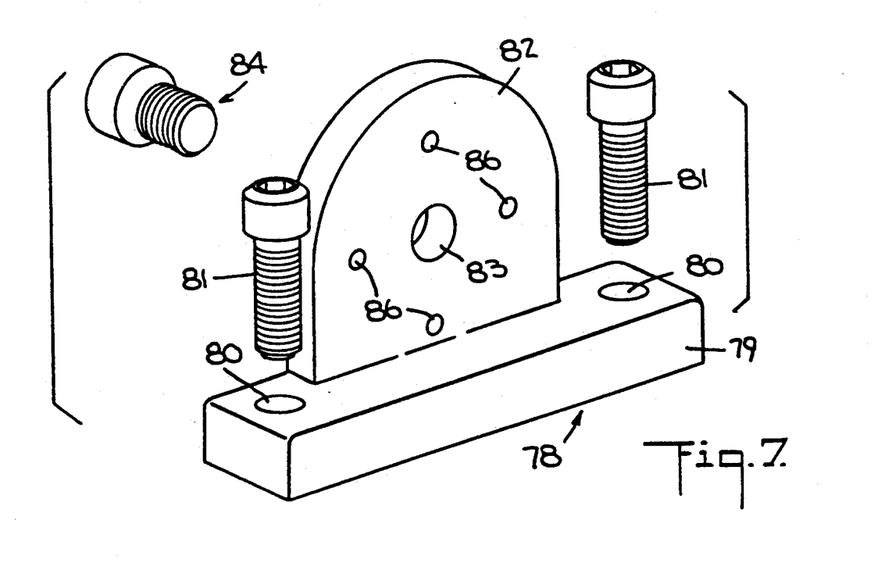
FIG. 7 shows a pillow block mounting for the transducer.

FIGS. 7 and 8 illustrate a pillow-block mounting means for the transducer arrangement. The base 79 of the pillow-block mount has bore holes 80 for screws 81 to attach the pillow-block mounting firmly to a support. The upstanding face 82 of the mounting means has a bore hole 83 for receiving a threaded fastener 84 which is threadedly received in a central threaded bore 85 in the body 10. Auxiliary mounting holes 86 and fasteners 87 can also be employed as shown. Other than the mounting arrangement the embodiment of FIG. 8 is like that of FIG. 4.

FIGS. 9 and 10 show yet another mounting arrangement in which a generally cup-shaped, externally threaded adapter sleeve 90 is fitted over and around the body 10 and secured in place by screw fasteners 91 passing through opposed holes in the adapter sleeve 90 and the inner face 22 of the body 10. The sleeve 90 has a circumferentially extending lip 92 near one sleeve end.

A hexagonal nut 93 is screw fitted around the cup-shaped adapter sleeve 90 and fixed against movement by set screw fasteners 94 (2 shown). A central circular opening 95 in the sleeve 90 is fitted with a generally ring-shaped spacer member 97 for attachment of the electrical connector 26 in an alternate connector position from that shown in FIGS. 1, 2, 4, 6 and 8, although it will be understood that this alternate connector position can also be employed in connection with the other embodiments of the apparatus, when space permits or requires.

As in the illustration of FIG. 2, the connector 26 has a rectangular base plate 52 which is fastened to the spacer member 97 by means of screws 53 which can be provided with washers. A tubular member 54 has external threads 55, all as in FIG. 2.

The assembly, when adapted as shown in FIGS. 9 and 10 can be fitted to a frame or fixture member having a circular opening by fitting the adapter sleeve 90 into the circular opening of the fixed structure with the lip 92 abutting against the front of the fixed structure, screwing on the adapter nut 93 from behind the fixed structure until the assembly is tightly secured, and then fixing the nut 93 in position by means of the set screws 94. This arrangement effectively replaces a bearing.

From the foregoing it will be clear that the transducer arrangement of the invention can be mounted by use of a single stud threaded in the central bore 85, by means of the two-post adapter flange of FIGS. 3 and 4, by means of the pillow-block bracket of FIGS. 7 and 8 and in the bearing replacement arrangement of FIGS. 9 and 10. The system shown can employ an electrical connector in different positions. The same basic transducer assembly can directly support a live roll as shown for example in the embodiment of FIG. 1 and can also support the shaft of an idler roll in the embodiment illustrated in FIGS. 5 and 6.

Since modular elements can be employed, the same bodies, beam members and bearings, with associated parts, can be used in a wide variety of applications.

Those familiar with the art will realize that numerous modifications, substitutions of parts and so forth can be made in accordance with the concept of the invention, and such obvious variations are within the spirit and scope of the invention.

What is claimed is:

1. Apparatus for sensing tension in a web passing over a rotating roll, comprising: a cylindrical housing for supporting one end of a roll; a spherical self-adjusting bearing within the housing and surrounding a cylindrical projecting outer end of a profiled beam member having a central flat portion of reduced thickness; a cylindrical body located entirely outside of said housing and not surrounding said housing so that said cylindrical body is free to move in a radial direction with respect to the axis of the housing, said cylindrical body being spaced and separated from the housing in the longitudinal direction of said beam member and surrounding the central flat portion of the beam member; said beam member having an inner end secured to and within said cylindrical body; a strain gage on said flat central portion of the beam member for producing an electrical signal representing mechanical strain in said flat central portion of the beam member; and means for mounting said cylindrical body in a fixed position.

2. The apparatus of claim 1 wherein said housing is provided with peripheral seal means for frictional fitting within a hollow end of a roll and including a circumferential lip on said housing for limiting the extent to which a roll can overlie the housing.

3. The apparatus of claim 2 and wherein said seal means comprises a plurality of ring seals in grooves around said housing.

4. The apparatus of claim 1 wherein the housing includes a clamp to embrace the end of a shaft.

5. The apparatus of claim 2 or 4 and including spring means for allowing some axial movement of the housing.

* * * * *

UNITED STATES PATENT AND TRADEMARK OFFICE
CERTIFICATE OF CORRECTION

PATENT NO. : 5,257,550
DATED : Nov. 2, 1993
INVENTOR(S) : William W. Montalvo, III
Philip R. Metcalf, Jr.

It is certified that error appears in the above-indentified patent and that said Letters Patent is hereby corrected as shown below:

Column 3

Line 9    "of the beam member as"

should read --of the beam member 11 as--

Column 5

Line 29    "pillow-block mounting firmly"

should read --pillow-block mounting means firmly --

Signed and Sealed this

Third Day of May, 1994

*Attest:*

BRUCE LEHMAN

*Attesting Officer*    *Commissioner of Patents and Trademarks*